(12) United States Patent
Dunfield et al.

(10) Patent No.: US 7,578,951 B2
(45) Date of Patent: Aug. 25, 2009

(54) METHOD OF MAKING MICROCAPSULES UTILIZING A FLUID EJECTOR

(75) Inventors: John Stephen Dunfield, Corvallis, OR (US); James W. Ayres, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1036 days.

(21) Appl. No.: 10/765,402

(22) Filed: Jan. 27, 2004

(65) Prior Publication Data

US 2005/0161844 A1    Jul. 28, 2005

(51) Int. Cl.
*B01J 13/02*    (2006.01)
*B01J 13/04*    (2006.01)
*A61K 9/50*    (2006.01)
*B41J 2/04*    (2006.01)

(52) U.S. Cl. .................. 264/4.1; 428/402.2; 347/54
(58) Field of Classification Search ............... 264/4.1; 427/2.14; 347/106; 435/174, 182
See application file for complete search history.

(56) References Cited

U.S. PATENT DOCUMENTS

| 4,322,449 | A |   | 3/1982  | Voss et al.        |
| 4,548,825 | A |   | 10/1985 | Voss et al.        |
| 4,692,284 | A |   | 9/1987  | Braden             |
| 4,877,745 | A |   | 10/1989 | Hayes et al.       |
| 5,395,620 | A |   | 3/1995  | Huc                |
| 5,462,866 | A | * | 10/1995 | Wang ......... 435/174 |
| 5,579,354 | A |   | 11/1996 | Sakai et al.       |
| 5,881,716 | A |   | 3/1999  | Wirch et al.       |
| 5,894,841 | A |   | 4/1999  | Voges              |
| 5,925,732 | A |   | 7/1999  | Ecker et al.       |
| 6,458,296 | B1 |  | 10/2002 | Heinzen            |
| 6,474,786 | B2 |  | 11/2002 | Percin et al.      |
| 6,641,254 | B1 | * | 11/2003 | Boucher et al. ........ 347/50 |
| 2003/0013783 | A1 | | 1/2003 | Kommareddi         |

FOREIGN PATENT DOCUMENTS

| DE | 100 24 154 | 11/2001 |
| JP | 52-011180 | 1/1977 |
| JP | 63-236534 | 10/1988 |
| JP | 2002-507473 | 3/2002 |
| JP | 2003-200036 | 7/2003 |
| WO | WO 96/28247 | 9/1996 |
| WO | WO 99/38535 | * 8/1999 |

* cited by examiner

*Primary Examiner*—James Seidleck
*Assistant Examiner*—Saira Haider

(57) ABSTRACT

A method of making microcapsules including activating a fluid ejector at a frequency greater than 10 kilohertz where each activation of the fluid ejector generates essentially a drop, and the fluid ejector is fluidically coupled to a first fluid including a core component. The method further includes ejecting the drop of the first fluid into a second fluid, the drop having a volume. In addition, the method includes generating a microcapsule, that includes the core component, in the second fluid for each drop of the first fluid ejected.

73 Claims, 4 Drawing Sheets

METHOD OF MAKING MICROCAPSULES UTILIZING A FLUID EJECTOR

BACKGROUND

1. Description of the Art

Micro-encapsulation techniques are increasingly being utilized in such diverse areas as drug delivery systems, cosmetics, agricultural, chemical, and food industries to enhance the effectiveness of a particular component at the lowest possible cost. Generally, microcapsule drug delivery systems are intended for oral, inhalation parenteral, ocular, or topical use. The release of orally administered medications may occur in the oral cavity such as for buccal or sublingual administration, or may occur in the gastrointestinal tract after the oral dosage form is swallowed. There are, for example, capsules and tablets that contain microcapsules to release the drug in the stomach, enteric-coated formulations that release the medication in the intestinal tract of the patient, and controlled release dosage capsules that release the drug in both the stomach and the intestines. Some microcapsules release drug in the lower intestinal tract including the colon. The profile and kinetic pattern governing the release rate of an entrapped active component from a microcapsule depends on the nature and morphology of the shell material encapsulating the active component, and formulation ingredients within the core and the shell material. Further, many individuals suffer from chronic health problems that require the regular administration of medicaments. Diseases such as diabetes, allergies, epilepsy, heart problems, AIDS, and even cancers require the regular delivery of precise doses of medicaments if patients are to survive over long periods of time.

Unfortunately, conventional oral dosage forms suffer from a number of disadvantages. Typically, to effectively handle and dispense small doses a considerable amount of adjuvant material must be added in order that the final dosage form is of a manageable size. Thus, typical methods for manufacturing include the mixing of the pure drug with various other substances commonly referred to as excipients or diluents that are therapeutically inert and acceptable by regulatory bodies, such as the Federal Drug Administration (FDA). Many if not most micro-encapsulation techniques generate a broad distribution of microcapsule sizes. The broad distribution in microcapsule size makes it more difficult to accurately dispense an optimal drug dosage. In addition, it produces greater variability in dissolution rates and, thus, decreases the control over the absorption rate of the drug in the body. In addition, there is an increasing need to control the drug absorption process to sustain adequate and effective drug levels over a prolonged time period.

The availability of useful drug delivery systems that provide an optimal drug dosage to be delivered to a particular site in the body by means of microcapsule dosage forms is very limited. The ability to control and extend the release of an active component from a microcapsule without adversely modifying the structure or normal biological function of the active component in the body after administration and absorption is also extremely limited today. If these problems persist, many new and potentially life saving beneficial drugs will either be impractical or have limited effectiveness in the dosage forms currently available. As the demands for more efficient and lower cost drugs continues to grow, the demand to develop systems or drug carriers capable of delivering the active molecules specifically to the intended target organ, while increasing the therapeutic efficacy will continue to increase as well.

DESCRIPTION OF THE PREFERRED EMBODIMENTS

The present invention advantageously utilizes a fluid ejection device to eject drops of a precise volume of a fluid, that includes a core material component, into a second fluid and generates a microcapsule in the second fluid, with the core material component encapsulated within the microcapsule. The present invention may utilize a wide variety of fluid ejection devices including both continuous and drop on demand types of fluid ejection devices. For example, thermally activated fluid ejection devices, piezoelectric, and acoustic activation as well as others may be utilized in the present invention. The present invention provides both for smaller drop volumes as well as greater control over repeatability of drop volume with its corresponding narrower distribution of drop volumes than typical microcapsule forming techniques.

For purposes of this description and the present invention, the term core material component may include, semiconductor, metal, bioactive, inorganic, organic, and polymeric materials having an advantageous property or utility encapsulated as nanometer or micrometer sized capsules or particulates. The term "bioactive" as used with fluid, composition, substance, or agent, may be a composition that affects a biological function of a living organism including plants, invertebrates or vertebrates directly or as a result of a metabolic or chemical modification associated with the organism or its vicinal environment. For example, a bioactive fluid may include any pharmaceutical substance, such as a drug, which may be given to alter a physiological condition of an organism, such as a disease. A bioactive fluid is meant to include any type of drug, medication, medicament, vitamin, nutritional supplement, or other compound that is designed to affect a biological function of a vertebrate. The term bioactive is also meant to include any substance including, but not limited to, insecticides, pesticides, or herbicides designed to affect a biological function.

Figure 1A:
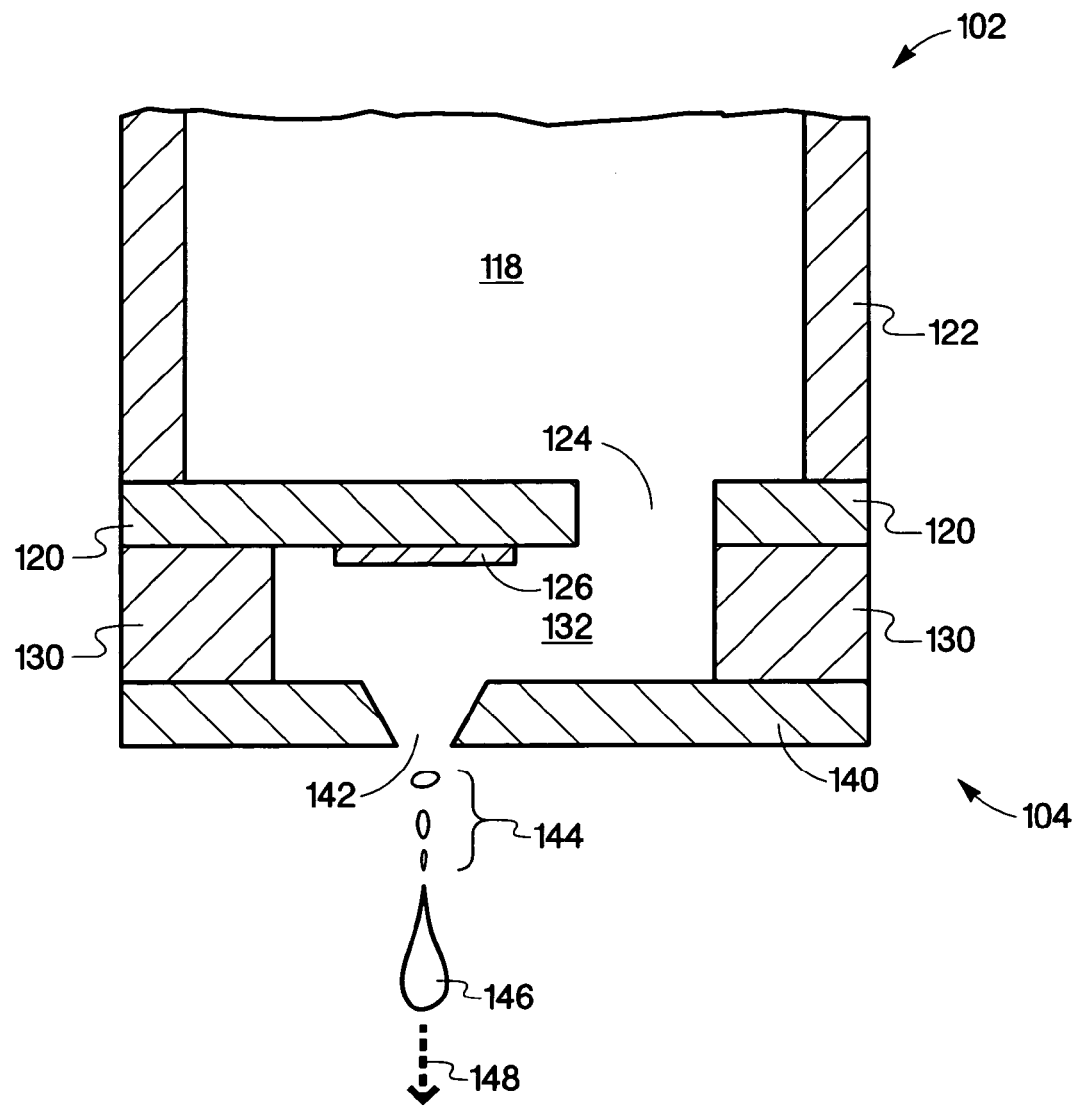
FIG. 1a is a cross-sectional view of a fluid ejection device according to an embodiment of the present invention.

An embodiment of fluid ejection device 102 that may be utilized to prepare microcapsules according to the present invention is illustrated, in a cross-sectional view, in FIG. 1a. In this embodiment, fluid reservoir 118, in a body portion of fluid ejection device 102, contains a first fluid that includes a core material to be encapsulated in a second fluid. Fluid reservoir 118 is fluidically coupled to a substrate 120 via fluid inlet passage 124. Depending on the particular fluid ejection device utilized generally substrate 120 is attached to device body 122. In alternate embodiments, substrate 120 may include integrated circuitry and may be mounted to what is commonly referred to as a chip carrier (not shown), which is attached to device body 122. The substrate 120 generally contains an energy-generating element or fluid ejector 126 that generates the force utilized to eject essentially a drop of fluid held in chamber 132. Fluid or drop ejector 126 creates a discrete number of drops of a substantially fixed size or volume. Two widely used energy generating elements are thermal resistors and piezoelectric elements. The former rapidly heats a component in the fluid above its boiling point causing vaporization of the fluid component resulting in ejection of a drop of the fluid. While the latter utilizes a voltage pulse to generate a compressive force on the fluid resulting in ejection of a drop of the fluid. For more information on various transducers utilized in drop-on-demand fluid ejection cartridges see Stephen F. Pond, Ph.D., *Inkjet Technology and Product Development Strategies*, ch 4 (Torrey Pines Research, 2000); and more particularly for thermal inkjet device technology see J. Stephen Aden et al., *The Third-Generation HP Thermal Inkjet Printhead*, Hewlett-Packard Journal, vol. 45, no.1, pg. 41-45, February 1994.

Substrate 120, chamber layer 130, nozzle layer 140, nozzles 142, and a flexible circuit (not shown) form what is generally referred to as ejector head 104. Chamber layer 130 forms the side walls of chamber 132 and substrate 120 and nozzle layer 140 form the bottom and top of chamber 132 respectively, where the substrate is considered the bottom of the chamber. In this embodiment, fluid ejection device 102 has a nozzle density of 300 nozzles per inch; however, in alternate embodiments, nozzle densities may range from a single nozzle up to over a 1000 per inch. In addition, in this embodiment, nozzle layer 140 contains one nozzle per fluid ejector through which fluid is ejected; however, in alternate embodiments, each fluid ejector may utilize multiple nozzles through which fluid is ejected. Each activation of a fluid ejector results in the ejection of a precise quantity of fluid in the form of essentially a fluid drop with the drop ejected substantially along fluid ejection axis 148. Each fluid drop may include primary drop 146 as well as possible secondary drops 144. Both the generation and size of the secondary drops depends on various parameters such as the firing frequency of fluid ejector 126, the surface tension of the fluid being ejected, the size and shape of nozzle 142, and the size, shape, and location of fluid ejector 126 to nozzle 142. The number of times the fluid ejector is activated, in this embodiment, controls the number of drops ejected. In this embodiment, fluid ejection device 102 operates at a frequency of greater than about 10 kilohertz for each fluid ejector or energy generating element. In alternate embodiments, fluid ejection device 102 having active circuitry integrated on substrate 120 may operate at frequencies greater than 20 kilohertz. Fluid ejection device 102 precisely controls in a discretely drop-by-drop manner the ejection of a fluid held in chamber 132. For more information on drop formation see, for example, Jaime H. Bohorquez et al., *Laser-Comparable Inkjet Text Printing*, Hewlett-Packard Journal, vol. 45, no. 1, pg. 9-17, February 1994; or William A. Buskirk et al., *Development of a High Resolution Thermal Inkjet Printhead*, Hewlett-Packard Journal, vol. 39, no. 5, pg. 55-61, October 1988.

Figure 1B:
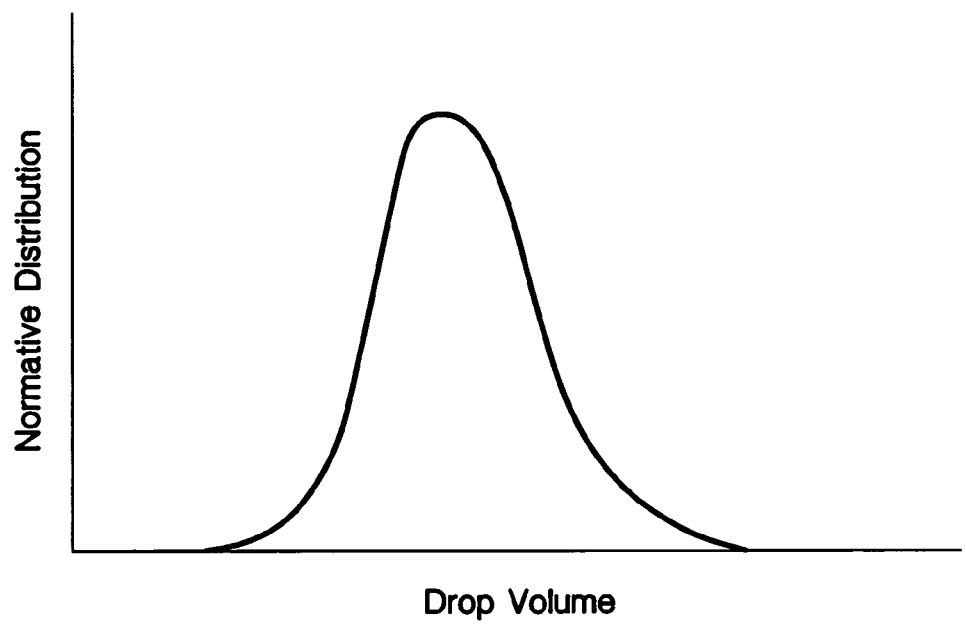
FIG. 1b is a graph illustrating a normalized drop-volume distribution of a conventional fluid ejector.
Figure 1C:
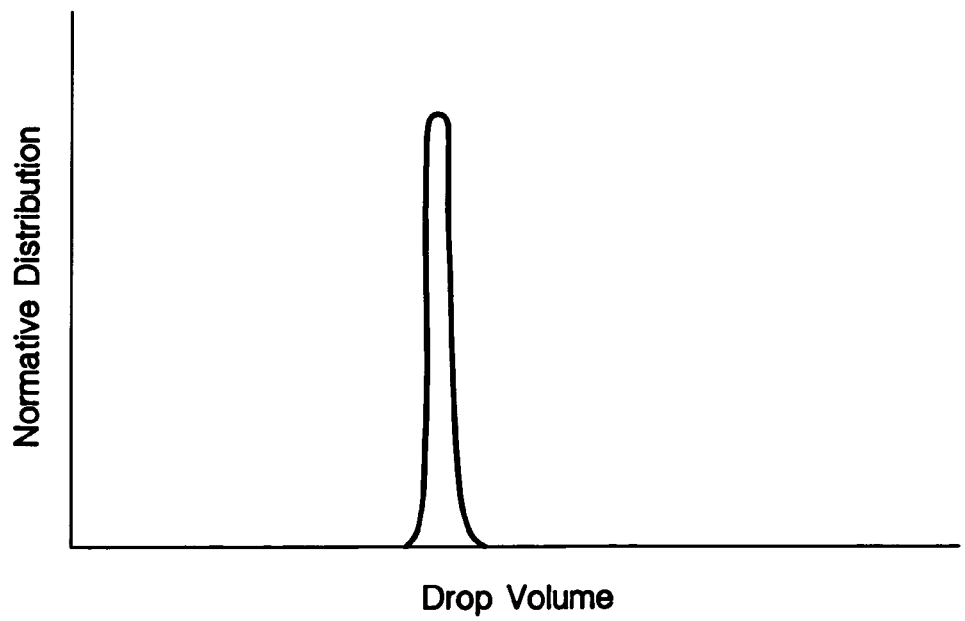
FIG. 1c is a graph illustrating a normalized drop-volume distribution of a fluid ejection device according to an embodiment of the present invention.

Fluid ejection device 102 described in the present invention can reproducibly and reliably eject drops in the range of from about 1 atto-liter to about 1 pico-liters depending on the parameters of the fluid ejection device such as the size and geometry of the chamber around the fluid ejector, the size and geometry of the fluid ejector, and the size and geometry of the nozzle. In an alternate embodiment, utilizing what is generally referred to as a "direct drive" fluid ejection device, drops in the range from about 1 atto-liter to about 100 pico-liters also may be utilized. In addition, in still other embodiments, drops in the range from about 5 femto-liters to about 1 micro-liter also may be utilized. Fluid ejection device 102 differs from conventional fluid ejectors such as hydraulic, air assisted, or ultrasonic nozzles in that rather than forming a spray of fluid having varying drop sizes, this embodiment, utilizes a drop generator that creates fixed-sized drops that are discretely ejected. FIG. 1*b* is a graph describing the normalized distribution of drop volume for conventional fluid ejectors utilizing hydraulic, air assisted, or ultrasonic nozzles. The particular drop volume distribution depends on the nozzle type and generally varies from one type to another. In addition, other factors such as the fluid properties, nozzle capacity, and spraying pressure also effect the drop volume. As is illustrated in FIG. 1*b* conventional fluid ejectors generally have a broad distribution of drop volumes. Fluid ejection device 102 differs from conventional fluid ejectors in that rather than forming a spray of fluid having varying drops volumes, activation of drop ejector 126 generates substantially fixed size drops that are discretely ejected. Fluid ejection device 102, on the other hand utilizes a method of creating discrete sized drops that are independently ejected from a particular nozzle utilizing a particular fluid ejector while maintaining a narrow drop volume distribution as shown in FIG. 1*c*. In addition, the narrow drop volume distribution is maintained over multiple nozzles each having a separate fluid ejector and fired independently or simultaneously. As can be seen comparing FIGS. 1*b* and 1*c* the present invention has a very narrow distribution of drop volumes and may have anywhere from a 2×, 3× or even more narrower drop volume distribution than conventional fluid ejectors. In this embodiment, the range in drop volume is generally within 10 percent of the targeted or specified value and under steady state conditions is within about 6 percent of the targeted value. Because of the narrow (near uniform) distribution of ejected drops from fluid ejector device 102, the distribution of the size of the microcapsules, formed from the ejected drops, have a corresponding narrow distribution in size. Thus, the present invention has the ability to accurately dispense a fluid including a core material component with a part per million to a part per billion accuracy. This is particularly advantageous when dispensing substances that have a high preparation cost. For example, materials such as certain proteins, peptides, hormones, antibiotics, and bioactive fluids derived from some natural products in scarce supply may be effectively dispensed and formed into microcapsules utilizing such a fluid ejection device. In addition, the accuracy and precision is advantageous when dispensing concentrated substances, such as pharmaceuticals with high potency.

Figure 2A:
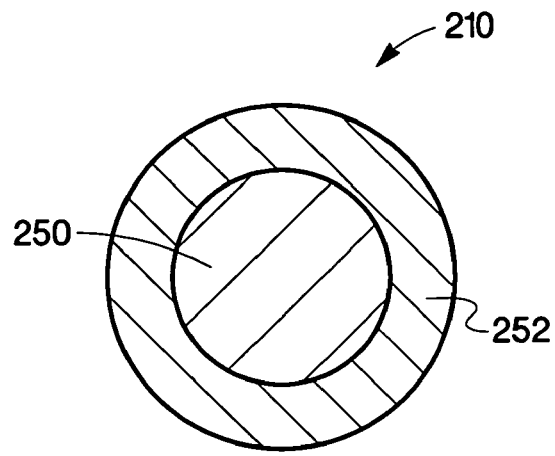
FIG. 2a is a cross-sectional view of a microcapsule according to an embodiment of the present invention.
Figure 2B:
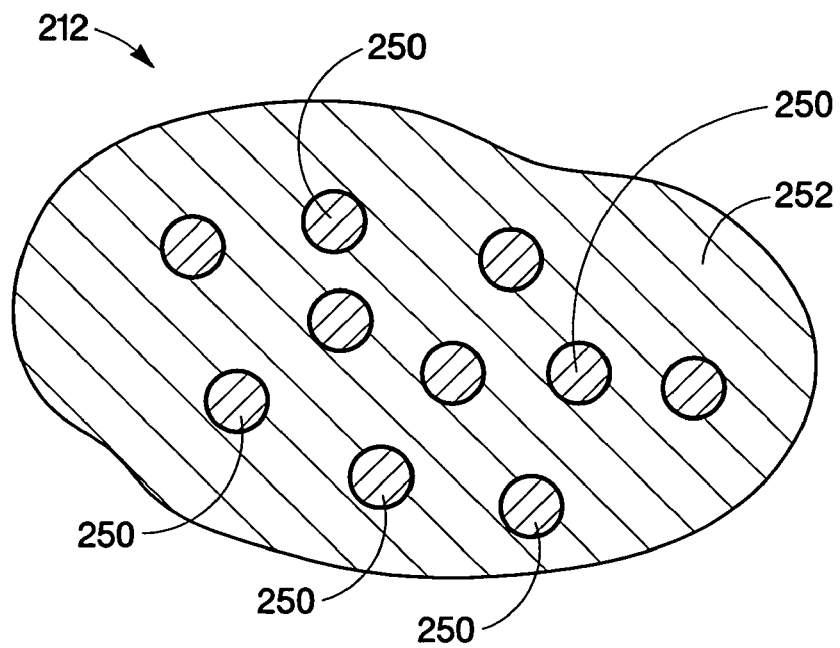
FIG. 2b is a cross-sectional view of a microcapsule according to an alternate embodiment of the present invention.

In the present invention microcapsules may have a variety of structures. For example, some may have a substantially spherical shape with a substantially continuous core region or core material 250 surrounded by substantially continuous shell material 252 as illustrated, in a cross-sectional view, in FIG. 2*a*. Although FIG. 2*a* depicts microcapsule 210 having a substantially spherical shape, microcapsule 210, in alternate embodiments, also may be formed having more oblate or prolate structures as well. In addition, continuous shell 252 as depicted in FIG. 2*a* has a uniform thickness, however, in alternate embodiments, continuous shell 252 also may have both a variation in shell thickness within a single microcapsule as well as variations in thickness from one microcapsule to another microcapsule. Another example of a microcapsule that may be formed utilizing the present invention is one having an irregular geometry containing a number of small droplets or particles of the core material component (i.e. core material 250) dispersed within shell material 252 to form microcapsule 212 as illustrated in a cross-sectional view in FIG. 2b.

Figure 3:
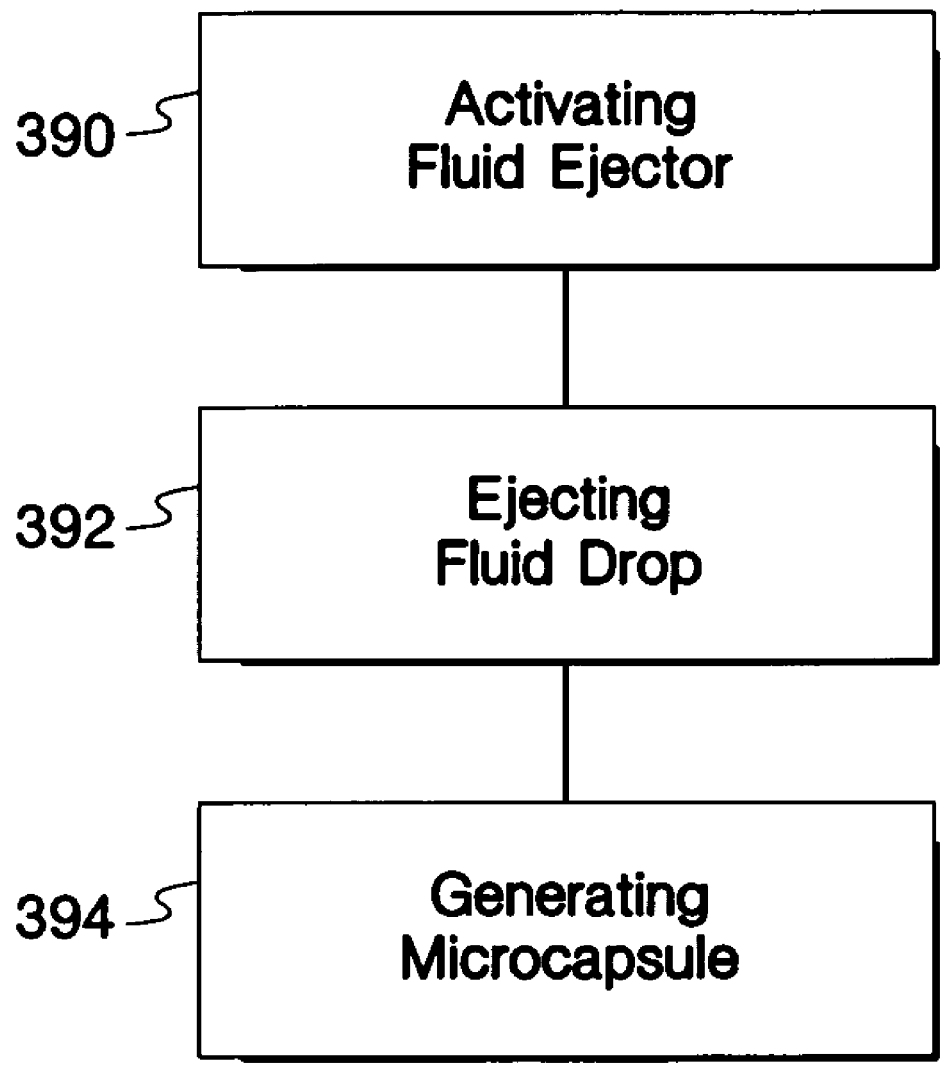
FIG. 3 is a flow diagram of a method of manufacturing microcapsules according to an embodiment of the present invention.

A flow diagram of a general method of manufacturing microcapsules, according to an embodiment of the present invention, is shown in FIG. 3. Fluid ejector activating process 390 is utilized to provide the desired amount of energy that initiates the drop forming process and depends on the particular type of fluid ejector utilized. For example, thermal fluid ejectors utilize pulses generally on the order of a few microseconds in duration providing a high to moderate current with moderate voltage when compared to piezoelectric fluid ejectors utilizing longer timed pulses providing very low current but moderate to higher voltage pulses. Electrostatic drop on demand type fluid ejectors, in contrast, utilize high voltage, low-power pulses, whereas acoustic fluid ejectors utilize radio frequency pulse bursts. Continuous fluid ejectors generally utilize three different sets of pulses, a low-power pulse for charging each nozzle through which drops are ejected, a periodic pulse of moderate power to synchronize drop break up, and a low power higher voltage pulse to deflect the fluid drops. The deflection of fluid drops is utilized to select which drops are recirculated and which drops are ejected from the device.

Fluid drop ejection process 392 is utilized to generate the force to eject a drop of fluid from a nozzle. Fluid drop ejection process 392 also depends on the particular type of fluid ejector utilized. For example, a thermal fluid ejector rapidly heats a component of the fluid above its boiling point causing vaporization of the fluid component generating a bubble whose expansion results in the ejection of a drop of the fluid. A piezoelectric transducer, on the other hand, utilizes a voltage pulse to generate a compressive force on the fluid resulting in ejection of a drop of the fluid through a nozzle. In contrast a continuous fluid ejector utilizes a fluid held under pressure in a chamber having a nozzle or bore to form a fluid jet that generally utilizes a piezoelectric vibrator attached to a wall of the chamber to generate the perturbation that causes the jet to breakup into drops. Any of these fluid ejector devices may be utilized in the present invention to eject a drop of a fluid that includes a core component or core material into a second fluid.

Microcapsule generating process 394 is utilized to form, in the second fluid, a microcapsule that includes the core material or core component. The particular process depends on the particular chemistry utilized to form the microcapsule. In one embodiment, a complex coacervation process occurs where cationic and anionic water-soluble polymers interact in water to form a liquid, polymer rich phase called a complex coacervate. For example, a water insoluble core component material such as a bioactive substance is dispersed using a dispersing agent forming a first fluid. The first fluid including the dispersed insoluble core component material is ejected or dispensed into the second fluid to form an emulsion of core material in the second aqueous based solution utilizing fluid drop ejection process 392. In this example the second fluid is an aqueous gelatin solution held at a temperature of 35-65° C. that contains a buffer solution maintaining the pH of the solution between 4.0 and 5.0. While maintaining the temperature above the melting point of the gelatin a polyanion polymer (e.g. natural or synthetic) may be added to the emulsion containing the core material and gelatin to form a complex coacervate. In this example a negatively charged polymer like gum arabic may be added to the heated emulsion. Cooling the solution to room temperature allows the gelatin in the coacervate to gel forming microcapsules of the bioactive core material surrounded by the rubbery gelatin shell. Although such microcapsules have a continuous gelatin shell formed around the core materials, generally the shell is not uniform in thickness. Depending on the particular application in which the microcapsules are utilized it also may be desirable to increase the strength of the gelatin shell of the microcapsules by further treating the microcapsules with a cross-linking agent such as glutaraldehyde. In addition, post treatment of the microcapsules with urea and formaldehyde under acidic conditions may be utilized to increase the resistance of the microcapsules to swelling in a moisture environment. In alternate embodiments, the polyanion polymer may be added to the first fluid that includes the dispersed insoluble core component and ejected into the second fluid. This embodiment eliminates the step of adding the polyanion to the emulsion formed by ejecting the dispersed core component into the second fluid. Complex coacervation may be utilized to form microcapsules of many liquids.

Complex coacervation utilizes two oppositely charged polymers, i.e. a cationic and an anionic species where both species are incorporated into the microcapsule. However, in an alternate embodiment, two incompatible polymers also may be utilized, to form microcapsules as well. For example, for core materials that are degraded neither by temperatures of 70-80° C. nor by the use of a solvent such as cyclohexane the core material may be dispersed, using an appropriate dispersing agent, in a cyclohexane ethycellulose solution and ejected into a second solution of cyclohexane including a non-polar polymer such as polyethylene to form a two phase system with a common solvent. When the system is cooled the ethyl cellulose solidifies and the microcapsules may be separated. Aspirin and potassium chloride are two examples of core materials that may be formed into microcapsules utilizing polymer incompatibility as a micro-encapsulation technique. A biodegradable shell utilizing poly(d,1-lactideglycolide) also may be prepared using this technique.

In an alternate embodiment, an interfacial reaction may be induced at or on the surface of a drop ejected from a fluid ejector. For example, a water immiscible core component liquid includes a monomer dissolved in the core component liquid. The particular monomer utilized will depend on the particular application in which the microcapsules will be used, various monomers such as isocyanates, acid chlorides as well as combinations or mixtures of monomers all may be utilized. The core component liquid is ejected into a second aqueous solution that includes a co-reactant to the monomer added to the core component liquid. The co-reactant reacts with the monomer at the interface to form a microcapsule shell. The particular co-reactant utilized depends on the particular monomer dissolved in the core component liquid. A polyurea shell is formed between an amine co-reactant and an isocyanate monomer, whereas a polyamide shell is formed between an amine co-reactant and an acid chloride monomer. A polyurethane shell may be formed between the reaction of a hydroxyl containing co-reactant and an isocyanate monomer. In those cases where the core component material is an aqueous solution the monomer is generally an amine or other aqueous soluble monomer and the co-reactant is dissolved in a water immiscible solvent as the second fluid.

In still other embodiments, the second fluid, into which the ejected drops are dispensed, may be stirred or flowed across the face of the fluid ejector device in a direction perpendicular to the fluid ejection axis (see fluid ejection axis 148 in FIG. 1) with the nozzle or nozzles of the fluid ejector device disposed either a pre-selected distance above the second fluid or inserted into the second fluid a pre-selected amount. For example, a fluid ejection device may eject drops onto a thin fluid sheet that may be flowing past the fluid ejector device. In still other embodiments, the second fluid may remain stationary while the fluid ejector device is scanned or moved laterally over or within the second liquid utilizing mechanisms similar to those used in ink jet printing devices. In an alternative embodiment, the second fluid into which the ejected drops are dispensed may be provided as a mist such as is generated by a spinning plate or wheel humidifier type device or compression ejection or other means in which the mist is directed into or across the path of drop 146 (see FIG. 1a). In still another embodiment, a mist of the second fluid may be generated utilizing a fluid ejection device similar to that described in FIG. 1a where the reservoir contains the second fluid.

In an exemplary embodiment of the present invention microcapsule generating process 394 utilizes chitosan calcium alginate microcapsules to encapsulate hemoglobin, cells, enzymes, or other biological molecules under mild conditions that maintains the activity of the biological macromolecules. In this embodiment, sodium alginate is dissolved, in an aqueous solution containing hemoglobin in the range from about 25 grams/liter to about 200 grams/liter, to obtain a final concentration of sodium alginate of about 1.8% weight of sodium alginate to volume of hemoglobin solution. The particular amount of hemoglobin utilized depends on the particular application in which the microcapsules will be utilized. The solution is then added to the reservoir of a fluid ejector device and then ejected as drops into a second aqueous fluid containing chitosan in the range from about 6 grams per liter to about 10 grams per liter. The particular amount of chitosan utilized will depend on various parameters such as the storage time of the capsules, the amount of hemoglobin being encapsulated, and whether the microcapsules are simultaneously or subsequently treated with calcium chloride. In addition, the chitosan solution includes 0.1% hydrochloric acid. In this embodiment, the chitosan solution also contains a 0.005 M $CaCl_2$ solution and the pH of the entire chitosan, hemoglobin, $CaCl_2$ solution is adjusted to have a value in the range from about 4.0 to 6.0 with 1 M NaOH. In an alternate embodiment, other salts having divalent or trivalent cations such as magnesium chloride, barium chloride, and aluminum sulfate also may be utilized. The chitosan alginate microcapsules are allowed to gel and harden for approximately 30 mins in the presence of the $CaCl_2$ before being isolated. In an alternate embodiment, the chitosan alginate microcapsules are formed in the chitosan 0.1% HCl solution and isolated. The isolated microcapsules are then treated with a 0.005 M $CaCl_2$ solution having a pH of 5.4 utilizing NaOH. The particular concentrations and the particular pH at which the microcapsules are formed will depend on the particular application in which the microcapsules will be utilized because the characteristics of the chitosan solution have been found to influence the hemoglobin permeability of the microcapsules. For example, the solution viscosity, pH, and molecular weight of the chitosan may each effect the permeability of the microcapsules. In still other embodiments, the alginate microcapsules may be further treated with poly-l-lysine, which will harden the outer shell of the microcapsules and prevent alginate untangling in a dilute solution.

In an alternate embodiment of the present invention chitosan calcium alginate microcapsules are formed to encapsulate protein and peptide drugs that are susceptible to enzymatic attack and acidic hydrolysis in the gastrointestinal region if orally administered. In this embodiment, a 2% (w/v) solution of sodium alginate and a 1% (w/w) solution of bovine serum albumin are mixed and the pH of the solution is adjusted to 5.5. In this embodiment, bovine serum albumin is utilized as a model representative of various protein or peptide drugs that may be encapsulated. Examples of proteins that may be utilized are interferons, interleukins, darbepoetins, ethanercept, epogens, activases, and dornases. Examples of peptides that may be utilized are gonadotropins, lisinopril, calcitonin, ocreotide, leuprolide, and glucagons family peptides. The alginate, bovine serum albumin solution is then added to the reservoir of a fluid ejector device and ejected as drops into a second aqueous fluid. The second aqueous fluid includes a 1% (w/v) chitosan solution dissolved in a 1% (v/v) acetic acid solution at room temperature. The second aqueous fluid is then diluted with an aqueous 3% $CaCl_2$ solution and the pH adjusted to 4.5 to obtain a second aqueous fluid having chitosan in the range from about 0.2% (w/v) to about 0.8% (w/v). The microcapsules are obtained by filtering, washing with distilled water, and then allowed to air dry. In still other embodiments, multilayer microcapsules may be formed by filtering and washing the initially formed microcapsules with distilled water followed by subsequent transfer to a stirred solution having chitosan in the range from about 0.02% to about 0.08%. The chitosan-alginate multilayer microcapsules are then transferred to a 0.5% $CaCl_2$ aqueous solution for about 10 minutes. These multilayer microcapsules generally show an increased delay in the release of entrapped protein compared to microcapsules formed in a single step.

In still another embodiment living cells suspended in sodium alginate solution are dispensed from a thermal inkjet (TIJ) device into water containing calcium chloride, thereby producing microcapsules containing encapsulated living cells. *Lactobacillus acidophilus* and *Lactobacillus bulgaricus* are isolated from Lactinex®, a commercially available tablet for treatment of intestinal disorders, and grown to a total cell count of about $1 \times 10^{10}$ in a suitable liquid laboratory nutrient medium broth. For all viable cell counting, cell chains and clumps are broken using a suitable blender such as a Waring blender. Sodium alginate (2 grams) is autoclaved and then added into 100 ml of the mature bacterial growth medium while slowly stirring. The bacterial cell preparation is dispensed from a sterile TIJ device into a sterilized aqueous solution containing one-molar calcium chloride. In this embodiment the second fluid or receptor fluid is a continuous thin liquid film where either the thin film is flowing perpendicular to the fluid ejection axis of the fluid ejection device or the fluid ejection device is scanned or moved laterally over the receptor thin film. The microcapsules containing living cells are collected or removed from the receptor fluid by centrifuging or by filtration with the calcium chloride receptor solution recycled and utilized to form additional microcapsules. In alternate embodiments, the calcium chloride receptor fluid is rapidly mixed with "top to bottom" mixing or stirring. Generally, over 80% of the cells in the growth medium/alginate mixture, are entrapped and viable in the microcapsule slurry collected by centrifugation. The microcapsules containing living cells may be used in the "wet" form as collected or may be dried, generally under vacuum and controlled temperature to minimize cell damage. In alternate embodiments, other drying techniques also may be utilized. The microcapsules containing the entrapped living cells are placed in gelatin capsules that are enteric coated and administered orally to mammals as intestinal tract microbial replacement or establishment therapy. In alternate embodiments, cells entrapped in microcapsules are utilized to inoculate milk to produce cheese. *Streptococcus thermophilius, Bifidobactria,* pancreatic cells, and red blood cells are just a few examples of other living cells, with isotonic adjustment as needed, that may be encapsulated utilizing the present invention

What is claimed is:

1. A method of making a microcapsule, comprising:
   activating a fluid ejector at a frequency greater than 10 kilohertz, wherein activating said fluid ejector comprises activating a thermal resistor and wherein each activation of said fluid ejector generates essentially a drop, said fluid ejector fluidically coupled to a first fluid including a core component;
   ejecting essentially said drop of said first fluid into a second fluid, said drop having a volume; and
   generating a microcapsule in said second fluid for each drop of said first fluid ejected, wherein said microcapsule includes said core component.

2. The method in accordance with the method of claim 1, wherein activating said fluid ejector further comprises activating a drop on demand fluid ejector.

3. The method in accordance with the method of claim 2, wherein activating said fluid ejector further comprises:
   activating a thermal resistor; and
   heating at least one component of said first fluid above the boiling point of said at least one component.

4. The method in accordance with the method of claim 1, wherein activating said fluid ejector actuator further comprises activating a fluid ejector energy generating element n times, ejecting n drops of said first fluid into said second fluid, wherein n is an integer.

5. The method in accordance with the method of claim 4, wherein said n drops produce a distribution of drop volumes within 10 percent of a specified volume.

6. The method in accordance with the method of claim 4, further comprising activating said fluid ejector energy generating element at a steady state producing a distribution of drop volumes within 6 percent of a specified volume.

7. The method in accordance with the method of claim 1, wherein said volume of said drop is in the range from about 1 atto-liter to about 100 pico-liters.

8. The method in accordance with the method of claim 1, wherein said volume of said drop is in the range from about 1 atto-liter to about 1 pico-liters.

9. The method in accordance with the method of claim 1, wherein activating said fluid ejector further comprises activating said fluid ejector at a frequency greater than 20 kilohertz.

10. The method in accordance with the method of claim 1, wherein activating said fluid ejector further comprises:
    applying an electrical pulse charging a nozzle through which said first fluid is ejected; and
    applying a voltage pulse to deflect a pre-selected number of drops.

11. The method in accordance with the method of claim 10, further comprising deflecting a pre-selected number of said drops into a recirculator.

12. The method in accordance with the method of claim 1, wherein ejecting said drop further comprises ejecting said drop a pre-selected distance above the surface of said second fluid.

13. The method in accordance with the method of claim 12 further comprising ejecting said drop of said first fluid into a thin liquid film of said second fluid.

14. The method in accordance with the method of claim 13, further comprising flowing said thin liquid film of said second fluid in a direction perpendicular to a fluid ejection axis of a fluid ejector head.

15. The method in accordance with the method of claim 1, wherein ejecting said drop further comprises ejecting said drop of said first fluid from a chamber through at least one nozzle formed in a nozzle layer, said chamber and said at least one nozzle each having a volume, wherein said volume of said chamber is greater than said volume of said nozzle.

16. The method in accordance with the method of claim 1, wherein ejecting said drop further comprises ejecting said drop of said first fluid from at least one nozzle formed in a nozzle layer.

17. The method in accordance with the method of claim 16, further comprising immersing said at least one nozzle wherein at least a portion of said nozzle layer is below the surface of said second fluid.

18. The method in accordance with the method of claim 17, further comprising flowing said second fluid in a direction perpendicular to a fluid ejection axis of a fluid ejector head.

19. The method in accordance with the method of claim 1, further comprising:
    moving said fluid ejector in at least one lateral direction over said second fluid;
    activating said fluid ejector at pre-selected lateral locations; and
    ejecting essentially a drop of said first fluid into said second fluid at each pre-selected lateral location.

20. The method in accordance with the method of claim 18, wherein moving said fluid ejector further comprises reciprocally translating said fluid ejector over said second fluid.

21. The method in accordance with the method of claim 1, further comprising flowing said second fluid in a thin film in a direction perpendicular to a fluid ejection axis of said fluid ejector.

22. The method in accordance with the method of claim 1, further comprising:
    moving said fluid ejector in at least one lateral direction in said second fluid;
    activating said fluid ejector at pre-selected lateral locations; and
    ejecting essentially a drop of said first fluid into said second fluid at each pre-selected lateral location.

23. The method in accordance with the method of claim 18, wherein moving said fluid ejector further comprises reciprocally translating said fluid ejector in a lateral direction in said second fluid.

24. The method in accordance with the method of claim 1, wherein ejecting said drop further comprises ejecting essentially said drop of said first fluid into a mist of said second fluid.

25. The method in accordance with the method of claim 24, further comprising:
    activating a plurality of second fluid ejectors fluidically coupled to said second fluid;
    ejecting multiple second fluid drops of said second fluid proximate to said drop of said first fluid; and
    generating said mist of said second fluid.

26. The method in accordance with the method of claim 25, wherein said multiple second fluid drops of said second fluid produce a distribution of second fluid drop volumes within 10 percent of a specified second fluid drop volume.

27. The method in accordance with the method of claim 1, wherein ejecting said drop further comprises ejecting said drop of said first fluid having a polyanion, wherein said core component is dispersed in said first fluid.

28. The method in accordance with the method of claim 1, wherein ejecting said first drop further comprises ejecting a drop of a first fluid immiscible with said second fluid.

29. The method in accordance with the method of claim 1, wherein ejecting said drop further comprises ejecting a drop of a first fluid including said core component and a monomer into a second fluid that includes a co-reactant to said monomer.

30. The method in accordance with the method of claim 29, further comprising reacting said monomer and said co-reactant to form a polymer shell encapsulating said core component.

31. The method in accordance with the method of claim 1, wherein said core component includes hemoglobin.

32. The method in accordance with the method of claim 1, wherein generating a microcapsule further comprises generating a chitosan alkali metal alginate microcapsule.

33. The method in accordance with the method of claim 1, wherein generating said microcapsule further comprises forming a coacervate.

34. A method of making a microcapsule, comprising:
activating a fluid ejector at a frequency greater than 10 kilohertz, wherein activating said fluid ejector further comprises activating a piezoelectric element and wherein each activation of said fluid ejector generates essentially a drop, said fluid ejector fluidically coupled to a first fluid including a core component;
ejecting essentially said drop of said first fluid into a second fluid, said drop having a volume; and
generating a microcapsule in said second fluid for each drop of said first fluid ejected, wherein said microcapsule includes said core component.

35. The method in accordance with the method of claim 34, wherein activating said fluid ejector further comprises activating a drop on demand fluid ejector.

36. The method in accordance with the method of claim 35, wherein activating said fluid ejector further comprises:
activating a thermal resistor; and
heating at least one component of said first fluid above the boiling point of said at least one component.

37. The method in accordance with the method of claim 34, wherein activating said fluid ejector actuator further comprises activating a fluid ejector energy generating element n times, ejecting n drops of said first fluid into said second fluid, wherein n is an integer.

38. The method in accordance with the method of claim 37, wherein said n drops produce a distribution of drop volumes within 10 percent of a specified volume.

39. The method in accordance with the method of claim 37, further comprising activating said fluid ejector energy generating element at a steady state producing a distribution of drop volumes within 6 percent of a specified volume.

40. The method in accordance with the method of claim 34, wherein said volume of said drop is in the range from about 1 atto-liter to about 100 pico-liters.

41. The method in accordance with the method of claim 34, wherein said volume of said drop is in the range from about 1 atto-liter to about 1 pico-liters.

42. The method in accordance with the method of claim 34, wherein activating said fluid ejector further comprises activating said fluid ejector at a frequency greater than 20 kilohertz.

43. The method in accordance with the method of claim 34, wherein activating said fluid ejector further comprises:
applying an electrical pulse charging a nozzle through which said first fluid is ejected; and
applying a voltage pulse to deflect a pre-selected number of drops.

44. The method in accordance with the method of claim 43, further comprising deflecting a pre-selected number of said drops into a recirculator.

45. The method in accordance with the method of claim 34, wherein ejecting said drop further comprises ejecting said drop a pre-selected distance above the surface of said second fluid.

46. The method in accordance with the method of claim 45, further comprising ejecting said drop of said first fluid into a thin liquid film of said second fluid.

47. The method in accordance with the method of claim 46, further comprising flowing said thin liquid film of said second fluid in a direction perpendicular to a fluid ejection axis of a fluid ejector head.

48. The method in accordance with the method of claim 34, wherein ejecting said drop further comprises ejecting said drop of said first fluid from a chamber through at least one nozzle formed in a nozzle layer, said chamber and said at least one nozzle each having a volume, wherein said volume of said chamber is greater than said volume of said nozzle.

49. The method in accordance with the method of claim 34, wherein ejecting said drop further comprises ejecting said drop of said first fluid from at least one nozzle formed in a nozzle layer.

50. The method in accordance with the method of claim 49, further comprising immersing said at least one nozzle wherein at least a portion of said nozzle layer is below the surface of said second fluid.

51. The method in accordance with the method of claim 50, further comprising flowing said second fluid in a direction perpendicular to a fluid ejection axis of a fluid ejector head.

52. The method in accordance with the method of claim 34, further comprising:
moving said fluid ejector in at least one lateral direction over said second fluid;
activating said fluid ejector at pre-selected lateral locations; and
ejecting essentially a drop of said first fluid into said second fluid at each pre-selected lateral location.

53. The method in accordance with the method of claim 51, wherein moving said fluid ejector further comprises reciprocally translating said fluid ejector over said second fluid.

54. The method in accordance with the method of claim 34, further comprising flowing said second fluid in a thin film in a direction perpendicular to a fluid ejection axis of said fluid ejector.

55. The method in accordance with the method of claim 34, further comprising:
moving said fluid ejector in at least one lateral direction in said second fluid;
activating said fluid ejector at pre-selected lateral locations; and
ejecting essentially a drop of said first fluid into said second fluid at each pre-selected lateral location.

56. The method in accordance with the method of claim 51, wherein moving said fluid ejector further comprises reciprocally translating said fluid ejector in a lateral direction in said second fluid.

57. The method in accordance with the method of claim 34, wherein ejecting said drop further comprises ejecting essentially said drop of said first fluid into a mist of said second fluid.

58. The method in accordance with the method of claim 57, further comprising:
activating a plurality of second fluid ejectors fluidically coupled to said second fluid;
ejecting multiple second fluid drops of said second fluid proximate to said drop of said first fluid; and
generating said mist of said second fluid.

59. The method in accordance with the method of claim 58, wherein said multiple second fluid drops of said second fluid produce a distribution of second fluid drop volumes within 10 percent of a specified second fluid drop volume.

60. The method in accordance with the method of claim 34, wherein ejecting said drop further comprises ejecting said drop of said first fluid having a polyanion, wherein said core component is dispersed in said first fluid.

61. The method in accordance with the method of claim 34, wherein ejecting said first drop further comprises ejecting a drop of a first fluid immiscible with said second fluid.

62. The method in accordance with the method of claim 34, wherein ejecting said drop further comprises ejecting a drop of a first fluid including said core component and a monomer into a second fluid that includes a co-reactant to said monomer.

63. The method in accordance with the method of claim 62, further comprising reacting said monomer and said co-reactant to form a polymer shell encapsulating said core component.

64. The method in accordance with the method of claim 34, wherein said core component includes hemoglobin.

65. The method in accordance with the method of claim 34, wherein generating a microcapsule further comprises generating a chitosan alkali metal alginate microcapsule.

66. The method in accordance with the method of claim 34, wherein generating said microcapsule further comprises forming a coacervate.

67. A method of making a microcapsule, comprising:
activating n times a drop-on-demand fluid ejector, said fluid ejector fluidically coupled to a first fluid including a core component, said fluid ejector operated at a frequency greater than 10 kilohertz, wherein each activation generates essentially a fluid drop of said first fluid;
ejecting essentially n drops of said first fluid into a second fluid producing a distribution of n fluid drop volumes, wherein each drop volume of said n fluid drops is within about 10 percent of a specified drop volume; and
generating a microcapsule in said second fluid, wherein said microcapsule includes said core component.

68. A method of using a drop on demand fluid ejection device, comprising:
energizing the drop on demand fluid ejection device wherein energizing the fluid ejection device further comprises energizing a thermally activated fluid ejection device;
ejecting essentially a drop of a first fluid including a microcapsule forming core component into a second fluid; and
generating a microcapsule in said second fluid, wherein said microcapsule includes said microcapsule forming core component.

69. A method of using a drop on demand fluid ejection device, comprising:
energizing the drop on demand fluid ejection device;
ejecting essentially a drop of a first fluid including a microcapsule forming core component into a second fluid;
generating a microcapsule in said second fluid, wherein said microcapsule includes said microcapsule forming core component; and
immersing the fluid ejection device a pre-selected distance in said second fluid.

70. A method of using a drop on demand fluid ejection device, comprising:
energizing the drop on demand fluid ejection device;
ejecting essentially a drop of a first fluid including a microcapsule forming core component into a second fluid; and
generating a microcapsule in said second fluid, wherein said microcapsule includes said microcapsule forming core component;
flowing said second fluid in a direction perpendicular to a fluid ejection axis of the fluid ejection device;
moving the fluid ejection device in at least one lateral direction in said second fluid; and
ejecting n drops of said first fluid into said second fluid at n pre-selected lateral locations.

71. A method of using a drop on demand fluid ejection device, comprising:
energizing the drop on demand fluid ejection device;
ejecting essentially a drop of a first fluid including a microcapsule forming core component into a second fluid; and
generating a microcapsule in said second fluid, wherein said microcapsule includes said microcapsule forming core component;
flowing said second fluid in a direction perpendicular to a fluid ejection axis of the fluid ejection device;
moving the fluid ejection device in at least one lateral direction over said second fluid; and
ejecting n drops of said first fluid into said second fluid at n pre-selected lateral locations.

72. The method in accordance with the method of claim 71, wherein moving said fluid ejector further comprises reciprocally translating said fluid ejector over said second fluid.

73. The method in accordance with the method of claim 71, further comprising flowing said second fluid in a thin film in a direction perpendicular to a fluid ejection axis of said fluid ejector.

* * * * *

UNITED STATES PATENT AND TRADEMARK OFFICE
CERTIFICATE OF CORRECTION

PATENT NO. : 7,578,951 B2 Page 1 of 1
APPLICATION NO. : 10/765402
DATED : August 25, 2009
INVENTOR(S) : John Stephen Dunfield et al.

It is certified that error appears in the above-identified patent and that said Letters Patent is hereby corrected as shown below:

In column 9, line 57, in Claim 13, delete "claim 12" and insert -- claim 12, --, therefor.

In column 12, line 1, in Claim 46, delete "claim 45." and insert -- claim 45, --, therefor.

In column 13, line 39, in Claim 68, delete "device" and insert -- device, --, therefor.

Signed and Sealed this

Thirtieth Day of March, 2010

David J. Kappos
*Director of the United States Patent and Trademark Office*